Nov. 15, 1960    L. BESSON    2,960,293
POWER PROPELLED VEHICLE OR OTHER MACHINE
Filed July 8, 1955    3 Sheets-Sheet 1

Nov. 15, 1960     L. BESSON     2,960,293
POWER PROPELLED VEHICLE OR OTHER MACHINE
Filed July 8, 1955     3 Sheets-Sheet 2

Inventor
L. Besson
By Glascock Downing Liebold
Attys.

Nov. 15, 1960 L. BESSON 2,960,293
POWER PROPELLED VEHICLE OR OTHER MACHINE
Filed July 8, 1955 3 Sheets-Sheet 3
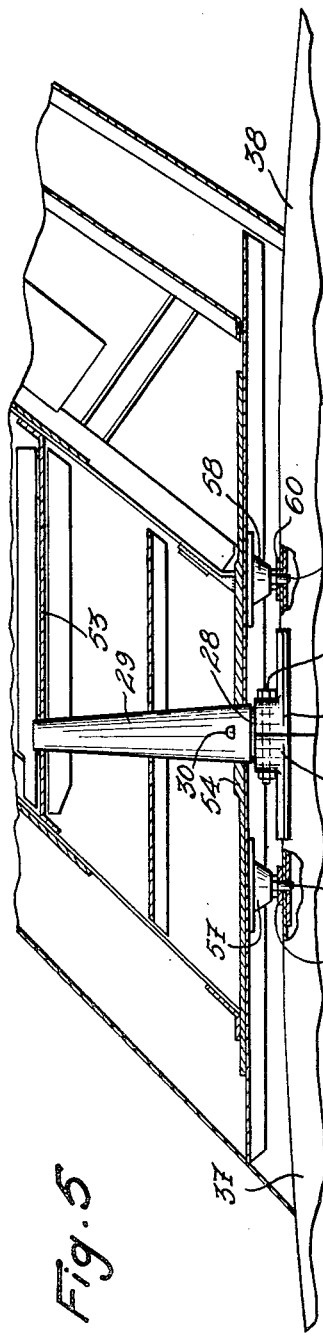
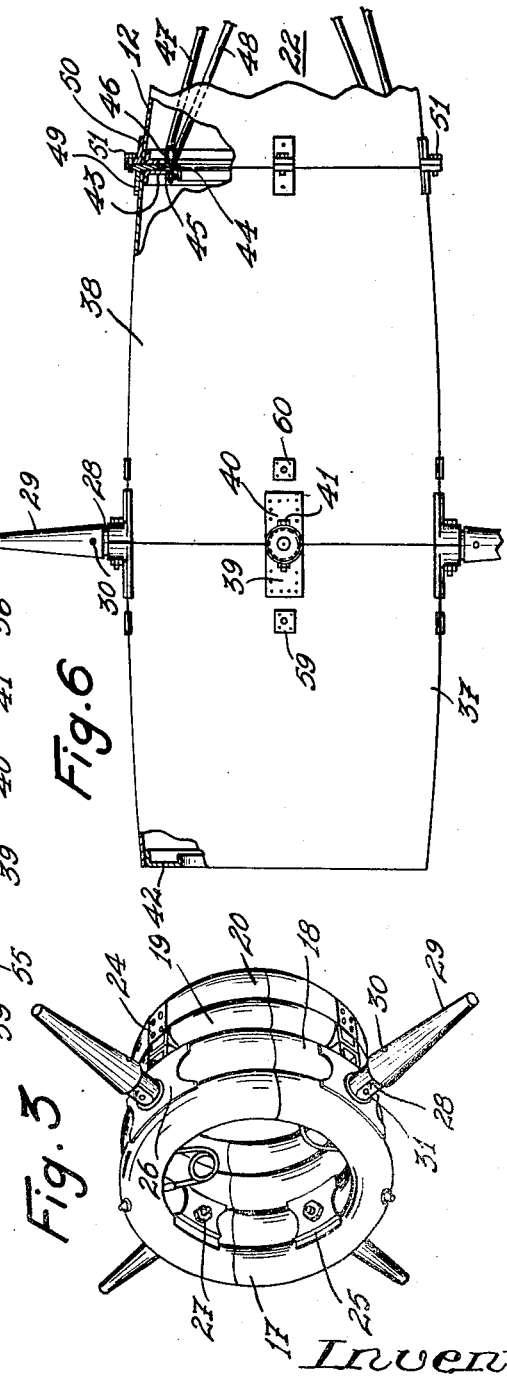
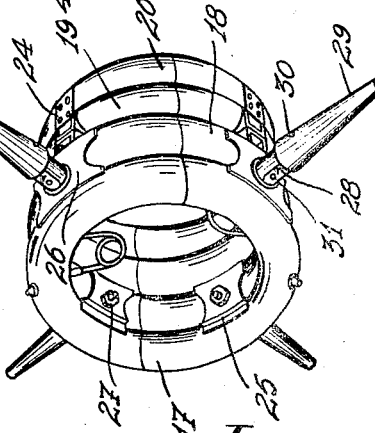
Inventor
L. Besson
By Glasworth Downing Seebold
Attys.

United States Patent Office 2,960,293
Patented Nov. 15, 1960

2,960,293

POWER PROPELLED VEHICLE OR OTHER MACHINE

Louis Besson, Le Cannet, France

Filed July 8, 1955, Ser. No. 520,647

Claims priority, application France July 9, 1954

13 Claims. (Cl. 244—119)

The invention relates to vehicles which are propelled by power means, and more particularly, to the structure of such vehicles.

Power-propelled vehicles generally comprise a structure which is independent from their accommodations, attachments and equipments, the latter being mounted by using members of said structure.

It is the main object of the present invention to simplify and lighten the structure of such power-propelled vehicles, by providing a structure therefor wherein the strong transverse frame or frames of the structure with respect to the longitudinal axis of the vehicle are constituted by one or more of the vehicle strong equipment devices. Preferably, said equipment devices are chosen among those which are already particularly strong by reason of their function. According to a preferred embodiment of the invention, said equipment devices are devices of the equipment of the propelling engine. Thus, if the propelling engine operates with a pressure fluid, the strong transverse frame or frames of the structure is or are conveniently the storage tank or tanks containing said pressure fluid. Preferably, said tank or tanks are torus-shaped and provided with spar elements used for securing other structure members of the vehicle or machine, such as supporting surfaces provided with steering devices.

The invention has also for an object the industrial application of the vehicle structures broadly specified above, for example in the construction of land-, sea-, or air-vehicles, and, more especially, jet propulsion aircraft, either driven by a pilot or self-controlled, or remote controlled, or again navigating according to a predetermined program or under the action of pulses emitted by a target-searching television head, and self-propelled missiles carrying explosive charges, such as air missiles or torpedoes.

Other features of the invention will be apparent in the following description, made with reference to accompanying drawings, of a particular embodiment of the invention given solely as an example without any restricting purpose in order to make it better understood how the invention may be carried into practice. In the drawings:

Fig. 3 is a perspective view of the main structure member of the missile illustrated in Figs. 1 and 2, which member is formed by a series of contiguous torus-shaped tanks fitted with spar elements used for attaching the wings;

Fig. 4 is a partial axial section of the pair of torus-shaped tanks supporting the spar elements, in a plane containing the axis of one of said spar elements;

Fig. 5 is a view, partly broken away, showing the fastening of one wing to the corresponding spar element; and Fig. 6 is an external view, partly broken away, of the central part of the missile illustrated in Figs. 1 and 2.

Figure 1:
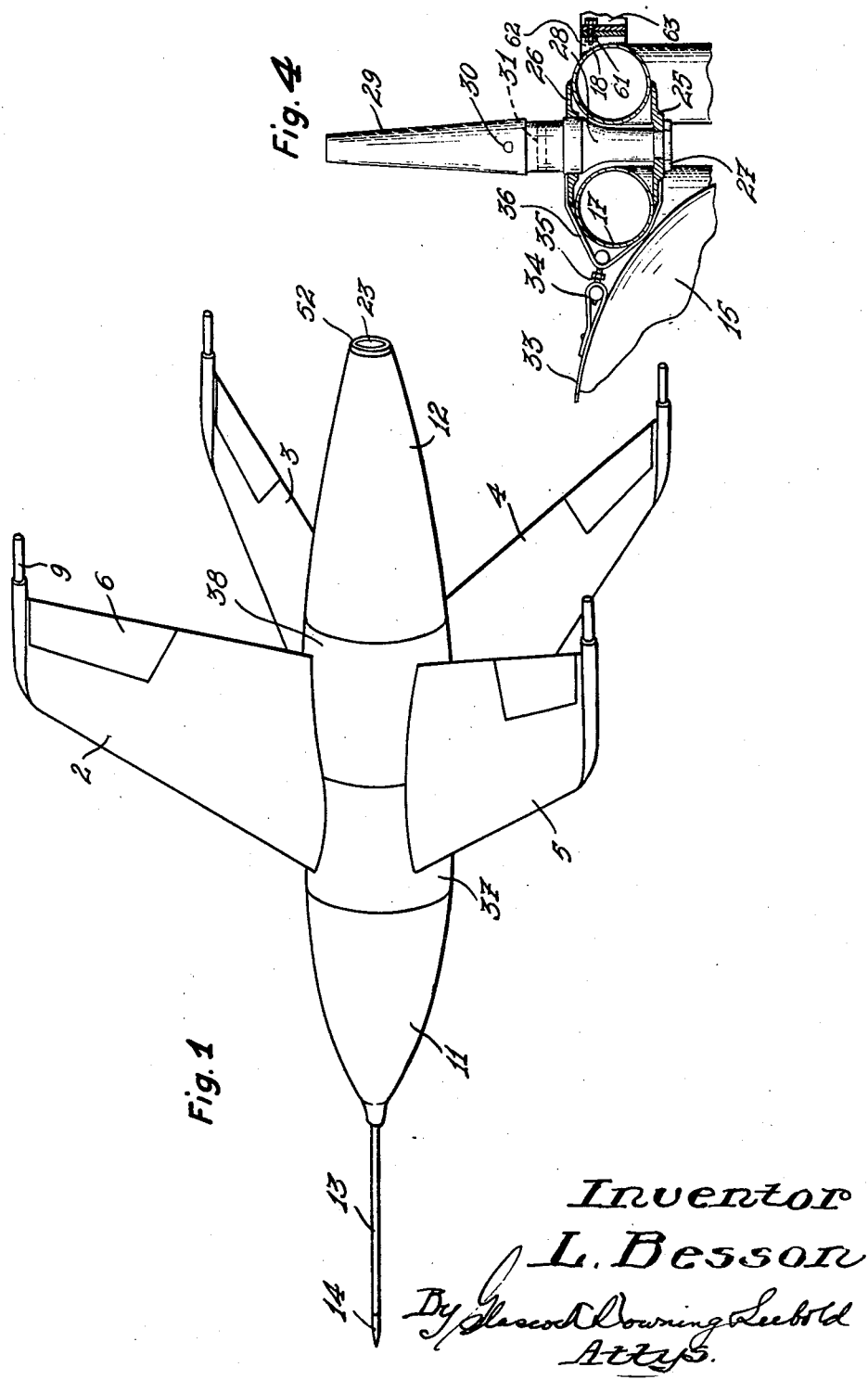
Fig. 1 is a perspective view of a self-propelled missile of the cross-shaped flying wing type, according to the invention.
Figure 2:
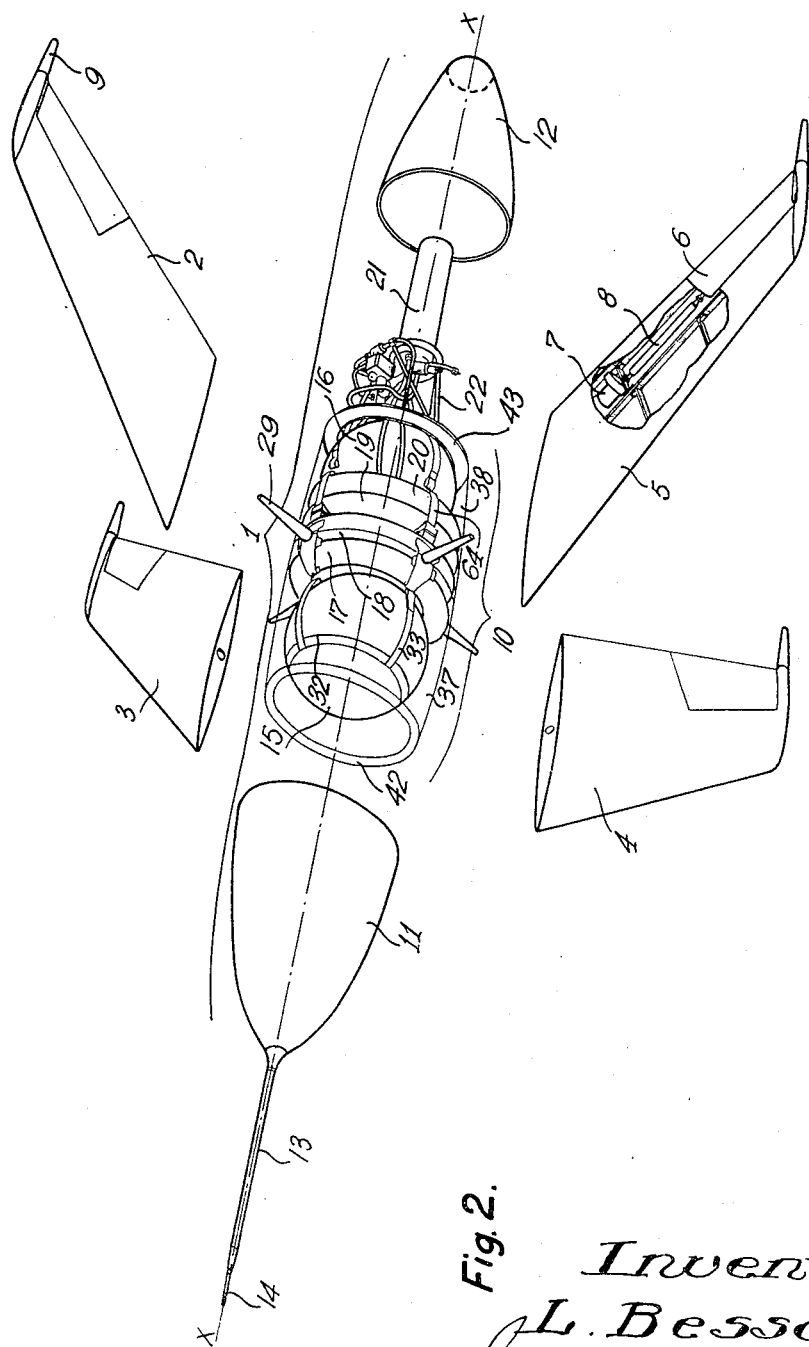
Fig. 2 is an exploded perspective view of the missile illustrated in Fig. 1, the outer shrouding or covering of the central part of the fuselage being assumed to be transparent.

The embodiment shown in the drawings illustrates the application of a structure according to the invention in the construction of a jet self-propelled subsonic missile of the cross-shaped flying wing type adapted to be used against aircraft.

The illustrated missile comprises a fuselage 1, the cross-sections of which are circular and centered on the longitudinal axis X—X of the missile, and four wing elements 2 to 5, substantially similar and arranged as a cross at right angles. Each wing element 2 to 5 is provided with a movable flap 6 operated by a ram 7, preferably electrical, operatively connected to said flap by a flexible shaft, or so-called flector, 8. The four elevon type flaps 6 work as combined controls to steer the missile along its path. The wing ends carry fixtures 9 which may be for example luminous tracing devices on two wing elements and radio guiding aerials on the other two wing elements.

The fuselage 1 is constituted by three parts, a central part 10, a forward pointed member 11 and a rear shrouding bullet 12. In the forward member 11 are accommodated all the flight control equipments, such as automatic piloting and guiding equipments, and the explosive charge. If the missile is to be used only for experimental purposes, said forward member serves to accommodate various measuring instruments and will conveniently be made releasable to be jettisoned and recovered by means of a parachute. The forward pointed member may carry a rod 13 extending along the fuselage axis line X—X and carrying in turn at its forward end the static pressure and incidence meterboom 14.

The power plant secured to the central part 10 of the fuselage comprises two spherical storage tanks, namely, a tank 15 containing a combustion liquid, and a tank 16 containing the liquid fuel, four compressed air tanks 17 to 20 and a combustion chamber 21 supported by a bracket 22 made of welded tubes and arranged to be housed in the rear bullet 12 provided with a jet nozzle opening 23. In the bracket 22 are mounted the equipments required for the operation of the jet engine, such as pressure reducer, high pressure air valve, liquid valves, regulating valve, etc.

The four compressed air storage tanks 17 to 20 are torus-shaped and made of steel tubes bent in the form of half circles and welded together. The air is stored therein at a pressure of the order of 2800 lbs./sq. in. They have consequently a wall thick enough to constitute strong and highly rigid members. For still increasing the rigidity of the assembly of said tanks, they are secured together by means of welded or bolted plates, such as the outer plates 24. Their outside diameter substantially corresponds to the fuselage outer contour, so that these torus-shaped tanks form the main or strong transverse frames of the supporting structure.

The advantage resulting from the use of said tanks as the strong transverse frames and which resides chiefly in a weight reduction, since the same members serve both as equipment parts and as elements of the supporting structure, may be further improved by using the first pair of torus-shaped tanks 17, 18 for constituting the strong transverse frame whereto are to be attached the four wing elements 2 to 5. For this purpose, said pair of tanks 17, 18 are provided, on two diameters at right angles, with inner plates 25 and outer plates 26 welded to said tanks and having secured thereon by means of nuts 27 spar elements or stumps 28 terminating with a tapered portion 29. The tapered portion 29 is provided with a radial hole 30 and the body of the stump 28 is provided with a radial hole 31 at right angles with the hole 30.

The two assemblies formed by the tanks 17, 18 secured together by the welded plates 25, 26, on the one hand, and by the tanks 19, 20 secured together by welded plates such as 24, on the other hand, are conveniently assembled together by means of bolts 61 clamping together fittings 62 welded on the tank 18 and fittings 63 welded on the tank 19.

The spherical shape of the end tanks 15, 16 and the torus shape of the tanks 17, 20 adjacent to said tanks 15, 16 permit the latter to project into the space surrounded by the tanks 17, 20. The spherical surfaces of said tanks 15, 16 engage the corresponding torus surfaces of the tanks 17, 20 whereon they may be correctly applied by simply interposing therebetween local liners not shown. The overall length of the tank assembly is thus reduced, and a light weight assembly is obtained by thus securing directly the spherical tanks to the strong member formed by the torus shaped tanks without using the intermediary of other structural elements.

The spherical tanks are secured to the torus-shaped tanks by means of a circular belt 32 provided with a number of lateral straps 33 terminating in loops 34 through which is passed a stretching element 35 extending either through a strap 36 secured to the plates 25, 26 for the tank 15, or through straps 64 secured to the plates 24 for the tank 16.

The unit formed by the tanks is covered by two annular shroud sections 37, 38 conformed to the outer shape of the fuselage. Said shroud sections are joined together in the plane of the axes of the spar stumps 28 through half-circular fittings 39, 40 provided with flanges riveted on the shrouding and clamped together by bolts 41 extending through the holes 31 in the stumps 28.

The forward shroud section 37 terminates at its free end with a transverse frame of medium strength 42 used as a frame for securing thereto the forward pointed member 11 and the equipment and explosive charge housed in said member 11. The rear shroud section 38 similarly terminates with a transverse frame of medium strength 43 whereon are mounted plates 44 for the fixation of the welded tube bracket 22. Said fixation is made by means of bolts 45 securing each plate 44 to a tubular element 46 whereto are welded a pair of adjacent tubes 47, 48 of the bracket 22. The rear shrouding bullet 12 is secured to the shroud section 38, for example by means of four flanged fittings 49 riveted to said shroud section 38 and four angle elements 50 riveted to said bullet 12 and connected to said fittings 49 by bolts 51.

It will be clear that, with the above described arrangement, all the forward and rear equipments and loads are secured only to the strengthened flame flanges 42, 43, the forward pointed member 11 and the removable rear bullet 12 completing the outer shrouding or covering of the fuselage.

The rear bullet 12 is reinforced around the nozzle opening 23 by a ring 52 which permits the missile to rest in a vertical position on a launching base or permits to fit therein an auxiliary take-off propelling means which may be finned or not.

The wings 2 to 5, which are preferably swept back, are of conventional construction, either of wood or of light alloy metal elements, or again of plastic material. They are secured to each spar stump 28 by the wedging engagement of reinforced elements of an inner rib 53 and of the marginal rib 54 of the wing on the tapering portion 29 of the spar stump 28. Each wing is held by a retaining pin passing through the hole 30 in the tapering part 29 of the corresponding spar stump 28. The torsional stresses of each wing are transmitted through two pegs 55, 56 extending from supporting pieces 57, 58 carried by the marginal rib 54 and engaging into registering fittings 59, 60 secured respectively to the forward and rear intermediate shroud sections 37, 38.

Many changes in and modifications of the illustrative structure shown in the drawings and herein particularly described may obviously be made by those skilled in the art without departing from the scope of the invention. In particular, all the structural features of the illustrated air missile may be provided in land, sea or air vehicles, either driven by a pilot or not, and in other self-propelled missiles or moving machines of any kind, such as torpedoes. Also, the number of torus-shaped tanks and spherical tanks are not limited to four and two as described above, and the scope of the invention includes any combination of any required number of groups of torus-shaped tanks and any number of spherical tanks, said groups of torus-shaped tanks being or not provided with means for connecting them to other structure elements.

What I claim is:

1. A structure for a vehicle propelled by an engine through a fluid medium and having accommodation means and equipment devices, comprising, in combination, a plurality of parallel annular transverse frames of medium strength at right angles to the longitudinal axis of the vehicle, at least one strong equipment device located between two annular transverse frames and having the shape of a body of revolution the axis of which is parallel to said longitudinal axis while its greatest diameter is at least equal to that of said annular transverse frames, each strong equipment device having a load strength greater than that of said annular transverse frames, a covering having the shape of a body of revolution the profile of which presents the minimum head-resistance to the displacements of the vehicle through the fluid medium, said covering being secured to said annular transverse frames and to each strong equipment device, whereby each strong equipment device acts as a strong transverse frame, structural elements secured on at least one strong equipment device and projecting radially beyond said covering, supporting surfaces mounted on said structural elements, and devices carried by said supporting surfaces and adapted to steer the vehicle through said fluid medium.

2. A structure for a vehicle propelled by an engine through a fluid medium and having accommodation means and equipment devices, comprising, in combination, a plurality of parallel annular transverse frames of medium strength at right angles to the longitudinal axis of the vehicle, at least one strong equipment device located between two annular transverse frames and having the shape of a body of revolution the axis of which is parallel to said longitudinal axis while its greatest diameter is at least equal to that of said annular transverse frames, each strong equipment device having, owing to its function, an inherent load strength which is greater than that of said annular transverse frames, a covering having the shape of a body of revolution the profile of which presents the minimum head-resistance to the displacements of the vehicle through the fluid medium, said covering being secured to said annular transverse frames and to each strong equipment device, whereby each strong equipment device acts as a strong transverse frame, structural elements secured on at least one strong equipment device and projecting radially beyond said covering, supporting surfaces mounted on said structural elements, and devices carried by said supporting surfaces and adapted to steer the vehicle through said fluid medium.

3. A structure for a vehicle propelled by an engine through a fluid medium and having accommodation means and equipment devices, comprising, in combination, a plurality of parallel annular transverse frames of medium strength at right angles to the longitudinal axis of the vehicle, at least one strong equipment device of the engine, located between two annular transverse frames and having the shape of a body of revolution the axis of which is parallel to said longitudinal axis while its greatest diameter is at least equal to that of said annular transverse frames, each strong equipment device having a load strength greater than that of said annular transverse frames, a covering having the shape of a body of revolution the profile of which presents the minimum head-resistance to the displacements of the vehicle through the fluid medium, said covering being secured to said annular transverse frames and to each strong equipment device, whereby each strong equipment device acts as a strong transverse frame, structural elements secured on at least one strong equipment device and projecting radially beyond said covering, supporting surfaces mounted on said structural elements, and devices carried by said supporting surfaces and adapted to steer the vehicle through said fluid medium.

4. A structure for a vehicle propelled by an engine through a fluid medium and having accommodation means, equipment devices and a propelling engine using a pressure fluid, comprising, in combination, a plurality of parallel annular transverse transverse frames of medium strength at right angles to the longitudinal axis of the vehicle, at least one storage tank containing a pressure fluid utilized by the propelling engine, located between two annular transverse frames and having the shape of a body of revolution the axis of which is parallel to said longitudinal axis while its greatest diameter is at least equal to that of said annular transverse frames, each storage tank having a load resistance greater than that of said annular transverse frames, a covering having the shape of a body of revolution the profile of which presents the minimum head-resistance to the displacements of the vehicle through the fluid medium, said covering being secured to said annular transverse frames and to each storage tank, whereby each storage tank acts as a strong transverse frame, structural elements secured on at least one storage tank and projecting radially beyond said covering, supporting surfaces mounted on said structural elements, and devices carried by said supporting surfaces and adapted to steer the vehicle through said fluid medium.

5. A structure for a vehicle propelled by an engine through a fluid medium and having accommodation means, equipment devices and a propelling engine using a pressure fluid, comprising, in combination, a plurality of parallel annular transverse frames of medium strength at right angles to the longitudinal axis of the vehicle, at least one torus-shaped storage tank parallel to the annular transverse frames, located between two annular transverse frames, containing a pressure fluid utilized by the propelling engine and having a load strength greater than that of said annular transverse frames while its greatest diameter is at least equal to that of said annular transverse frames, a covering having the shape of a body of revolution the profile of which presents the minimum head-resistance to the displacement of the vehicle through the fluid medium, said covering being secured to said annular transverse frames and to each storage tank, whereby each storage tank acts as a strong transverse frame, spar elements secured on at least one storage tank and projecting radially beyond said covering, supporting surfaces mounted on said spar elements, and devices carried by said supporting surfaces and adapted to steer the vehicle through said fluid medium.

6. A structure for a vehicle propelled by an engine through a fluid medium and having accommodation means, equipment devices, and a propelling engine using compressed air, comprising, in combination, a plurality of parallel annular transverse frames of medium strength at right angles to the longitudinal axis of the vehicle, a plurality of torus-shaped pressure air storage tanks parallel to the annular transverse frames and forming at least one substantially cylindrical assembly located between two annular transverse frames and the outer diameter of which is at least equal to that of said annular transverse frames, each storage tank having a load resistance greater than that of said annular transverse frames, means for assembling the storage tanks to form a cylindrical assembly in order to increase the rigidity thereof, a covering having the shape of a body of revolution the profile of which presents the minimum head-resistance to the displacements of the vehicle through the fluid medium, said covering being secured to said annular transverse frames and to each storage tank, whereby each storage tank acts as a strong transverse frame, spar elements secured on at least one storage tank and projecting radially beyond said covering, supporting surfaces mounted on said spar elements, and devices carried by said supporting surfaces and adapted to steer the vehicle through said fluid medium.

7. A structure, according to claim 6, wherein the means for assembling the storage tanks comprises assembling plates interconnecting said tanks two by two.

8. A structure, according to claim 6, further comprising internal and external plates secured to a plurality of the torus-shaped tanks pertaining to a cylindrical assembly, said spar elements being secured on said plates.

9. A structure for a vehicle propelled by an engine through a fluid medium and having accommodation means, equipment devices and a jet engine fed with at least one fuel cooperating with compressed air, comprising, in combination, a plurality of parallel annular transverse frames of medium strength at right angles to the longitudinal axis of the vehicle, a plurality of torus-shaped pressure air storage tanks parallel to the annular transverse frames and forming at least one substantially cylindrical assembly located between two annular transverse frames and the outer diameter of which is at least equal to that of said annular transverse frames, each storage tank having a load resistance greater than those of said annular transverse frames, at least one spherical fuel supply tank engaging one end of a cylindrical assembly of torus-shaped tanks while bearing against said end, means for securing each spherical tank on the corresponding cylindrical assembly, a covering having the shape of a body of revolution the profile of which presents the minimum head-resistance to the displacements of the vehicle through the fluid medium, said covering being secured on said annular transverse frames and on each storage tank, whereby each storage tank acts as a strong transverse frame, spar elements secured on at least one storage tank and projecting radially beyond said covering, supporting surfaces mounted on said spar elements, and devices carried by said supporting surfaces and adapted to steer the vehicle through said fluid medium.

10. A structure for a vehicle propelled by an engine through a fluid medium and having accommodation means, equipment devices and a jet engine fed with at least one fuel cooperating with compressed air, comprising, in combination, a series of torus-shaped pressure air storage tanks centered on the longitudinal axis of the vehicle and forming a substantially cylindrical assembly, means for assembling together the storage tanks forming said cylindrical assembly in order to increase the rigidity thereof, at least one spherical fuel supply tank engaging one end of said cylindrical assembly while bearing against said end, means for securing each spherical tank on the cylindrical assembly, spar elements disposed in a common transverse plane and secured to said cylindrical assembly and projecting outwardly, two annular shroud members secured on said cylindrical assembly and joined together in the plane of the middle line of said spar elements, two annular transverse frames of medium strength at right angles to the longitudinal axis of the vehicle, respectively secured on the free ends of said shroud members and the outer diameter of which is at the most equal to that of said torus-shaped storage tanks, a front covering element, a rear covering element, two annular transverse frames respectively secured on the rear and front ends of said front and rear covering elements, having respectively the same diameters as, and adapted to be fitted on, the transverse frames of medium strength carried by said shroud members, the assembly of said shroud members and said front and rear covering elements having the shape of a body of revolution the profile of which presents the minimum head-resistance to the displacements of the vehicle through the fluid medium, supporting surfaces, devices carried by said supporting surfaces and adapted to steer the vehicle through said fluid medium, and means for securing said supporting surfaces on said spar elements.

11. A structure, according to claim 10, wherein each spar element is in the form of a stump, wherein each supporting surface is provided with a marginal rib and at least one inner rib parallel to said marginal rib, said ribs being formed with holes adapted to allow the passage of the corresponding spar element and the wedging engagement of the supporting surface therewith, and wherein the means for securing the supporting surface on the spar element comprises a retaining pin mounted through a hole provided in the spar element on the side of the marginal rib which is opposite to the shroud elements, at least one peg carried by said marginal rib, and a fitting secured on the corresponding shroud element and formed with a hole for engaging said peg.

12. A structure for a missile propelled by an engine through a fluid medium and having accommodation means, equipment devices and a jet engine fed with at least one fuel cooperating with compressed air, comprising, in combination, a plurality of parallel annular transverse frames of medium strength at right angles to the longitudinal axis of the vehicle, a series of torus-shaped pressure air storage tanks parallel to the annular transverse frames and forming a substantially cylindrical assembly the outer diameter of which is at least equal to that of said annular transverse frames, means for assembling together the storage tanks forming said cylindrical assembly in order to increase the rigidity thereof, at least one spherical fuel supply tank engaging one end of said cylindrical assembly while bearing against said end, means for securing each spherical tank on the cylindrical assembly, four spar elements secured on said cylindrical assembly at right angles from each other in a common transverse plane and projecting outwardly, a covering having the shape of a body of revolution the profile of which presents the minimum head-resistance to the displacements of the vehicle through the fluid medium, said covering being secured to said annular transverse frames and to at least one of said storage tanks, said covering comprising a releasable forward pointed element adapted to accommodate the displacement control equipments and an explosive charge, a central part housing the storage and fuel supply tanks, and a rear shrouding element adapted to accommodate the jet engine and its equipments, four substantially similar surfaces arranged as a cross at right angles on said spar elements and adapted to support the moving vehicle in the fluid medium, and, for each supporting surface, a device carried by said surface and adapted to control the evolutions of the vehicle through said fluid medium, and means for controlling said device.

13. In a vehicle, a bracket, a jet engine including a nozzle mounted in said bracket, control devices for said vehicle, a plurality of tanks to provide fuel, combustion liquid and air under high pressure, said tanks being secured together to form a cylindrical unit centered on the longitudinal axis of the vehicle, at least one of said tanks providing for high pressure air being in toroidal shape centered on said longitudinal axis, spar members rigidly mounted on and extending radially from said toroidal tank, forwardly and rearwardly extending shrouds each secured in edge abutting relation to said toroidal tank, the diameters of said shrouds being such as to closely engage the circumference of said toroidal tank, each said shroud terminating at its end remote from said toroidal tank in an annular transverse frame element at right angles to said longitudinal axis, the length of said shrouds being such as to substantially enclose said unit, a forward pointed member secured to said transverse annular frame of said forwardly extending shroud providing accommodation for said vehicle control devices, said bracket being rigidly secured to said transverse annular frame of said rearwardly extending shroud, and a rear shroud provided with a nozzle opening at its rear end secured to said rearwardly extending shroud and encircling said bracket and jet engine mounted therein, and wings mounted on said spar members.

References Cited in the file of this patent

UNITED STATES PATENTS

| | | |
|---|---|---|
| 1,431,521 | Hall | Oct. 10, 1922 |
| 1,922,371 | Jones | Aug. 15, 1933 |
| 2,147,654 | Knight | Feb. 21, 1939 |
| 2,236,482 | Zindel | Mar. 25, 1941 |
| 2,399,494 | Manson et al. | Apr. 30, 1946 |
| 2,590,009 | Hannum | Mar. 18, 1952 |
| 2,691,495 | Chiroky | Oct. 12, 1954 |
| 2,763,447 | Carrau | Sept. 18, 1956 |
| 2,816,721 | Taylor | Dec. 17, 1957 |

FOREIGN PATENTS

| | | |
|---|---|---|
| 686,304 | Great Britain | Jan. 21, 1953 |